(12) United States Patent
Dorris et al.

(10) Patent No.: US 6,569,226 B1
(45) Date of Patent: May 27, 2003

(54) METAL/CERAMIC COMPOSITES WITH HIGH HYDROGEN PERMEABILITY

(75) Inventors: Stephen E. Dorris, La Grange Park, IL (US); Tae H. Lee, Naperville, IL (US); Uthamalingam Balachandran, Hinsdale, IL (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 0 days.

(21) Appl. No.: 09/967,890

(22) Filed: Sep. 28, 2001

(51) Int. Cl.⁷ .................. B01D 53/22; B01D 71/02
(52) U.S. Cl. ............................ 95/56; 96/4; 96/11
(58) Field of Search .................. 55/523; 95/55, 95/56; 96/4, 11

(56) References Cited

U.S. PATENT DOCUMENTS

| | | | |
|---|---|---|---|
| 2,958,391 A | * 11/1960 | De Rosset | 95/56 |
| 3,344,582 A | * 10/1967 | Merrill et al. | 95/56 |
| 3,350,845 A | * 11/1967 | McKinley | 95/56 |
| 3,413,777 A | * 12/1968 | Langley et al. | 96/4 |
| 4,857,080 A | 8/1989 | Baker et al. | |
| 4,921,616 A | * 5/1990 | Minjolle | 210/767 |
| 5,030,661 A | 7/1991 | Lywood | |
| 5,094,927 A | 3/1992 | Baucke et al. | |
| 5,106,588 A | * 4/1992 | Sims et al. | 55/523 X |
| 5,332,597 A | 7/1994 | Carolan et al. | |
| 5,366,712 A | 11/1994 | Violante et al. | |
| 5,447,559 A | 9/1995 | Rao et al. | |
| 5,518,530 A | 5/1996 | Sakai et al. | |
| 5,534,471 A | * 7/1996 | Carolan et al. | 96/4 X |
| 5,558,760 A | * 9/1996 | Sekhar | 55/523 X |
| 5,645,626 A | 7/1997 | Edlund et al. | |
| 5,652,020 A | 7/1997 | Collins et al. | |
| 5,674,301 A | 10/1997 | Sakai et al. | |
| 5,725,633 A | 3/1998 | Ozcayir et al. | |
| 5,782,959 A | * 7/1998 | Yang et al. | 95/56 X |
| 5,958,098 A | * 9/1999 | Heung | 95/56 X |
| 5,980,989 A | 11/1999 | Takahashi et al. | |
| 5,989,319 A | * 11/1999 | Kawae et al. | 95/56 X |
| 6,066,592 A | 5/2000 | Kawae et al. | |
| 6,235,417 B1 | * 5/2001 | Wachsman et al. | 95/56 X |
| 6,267,801 B1 | * 7/2001 | Baake et al. | 95/56 |
| 6,296,687 B2 | * 10/2001 | Wachsman et al. | 95/55 |
| 6,432,308 B1 | * 8/2002 | Gill | 55/523 X |

FOREIGN PATENT DOCUMENTS

| | | | |
|---|---|---|---|
| JP | 53-043153 B | * 11/1978 | 95/56 |
| JP | 61-138519 A | * 6/1986 | 95/56 |

* cited by examiner

Primary Examiner—Robert H. Spitzer
(74) Attorney, Agent, or Firm—Joy Alwan; Thomas G. Anderson; Paul A. Gottlieb

(57) ABSTRACT

A membrane for separating hydrogen from fluids is provided comprising a sintered homogenous mixture of a ceramic composition and a metal. The metal may be palladium, niobium, tantalum, vanadium, or zirconium or a binary mixture of palladium with another metal such as niobium, silver, tantalum, vanadium, or zirconium.

18 Claims, 3 Drawing Sheets

METAL/CERAMIC COMPOSITES WITH HIGH HYDROGEN PERMEABILITY

CONTRACTUAL ORIGIN OF INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

1. Field of the Invention

This invention relates to a membrane and method for extracting hydrogen from fluids and, more particularly, this invention relates to a high-flow rate membrane and an improved method for extracting hydrogen from fluid without using electrical power or circuitry.

2. Background of the Invention

Global environmental concerns have ignited research to develop energy generation technologies which have minimal ecological damage. Concerns of global climate change are driving nations to develop electric power generation technologies and transportation technologies which reduce carbon dioxide emissions.

Hydrogen is considered the fuel of choice for both the electric power and transportation industries. While it is likely that renewable energy sources will ultimately be used to generate hydrogen, fossil-based technologies will be utilized to generate hydrogen in the near future.

The need to generate ever larger amounts of hydrogen is clear. Outside of direct coal liquefaction, other major industrial activities, such as petroleum refining, also require hydrogen. Collectively, petroleum refining and the production of ammonia and methanol consume approximately 95 percent of all deliberately manufactured hydrogen in the United States. As crude oil quality deteriorates, and as more stringent restrictions on sulfur, nitrogen and aromatics are imposed, the need for more hydrogen by the refining industry will increase.

Hydrogen production, as a consequence of other processes, is significant. A number of industries requiring hydrogen produce effluents containing significant amounts of unused hydrogen. However, this hydrogen requires clean-up prior to re-use. Furthermore, hydrogen is produced from the combustion of oil, methane, coal, and other petroleum-based materials. However, this hydrogen must be separated from other combustion gases, namely carbon dioxide, in order to be of use.

Petroleum refineries currently use cryogenics, pressure swing adsorption (PSA), and membrane systems for hydrogen recovery. However, each of these technologies has their limitations. For example, because of its high costs, cryogenics generally can be used only in large-scale facilities which can accommodate liquid hydrocarbon recovery. Membrane-based PSA systems require large pressure differentials across membranes during hydrogen diffusion. This calls for initial compression of the feed prior to contact to the upstream side of polymeric membranes and recompression of the permeate to facilitate final purification steps. Not only are these compression steps expensive, but PSA recovers less feedstream hydrogen and is limited to modest temperatures. U.S. Pat. No. 5,447,559 to Rao discloses a multi-phase (i.e. heterogenous) membrane system used in conjunction with PSA sweep gases.

Many membrane systems have been developed in efforts to efficiently extract target material from feed streams. Some of these membrane systems (U.S. Pat. Nos. 5,030,661, 5,645,626, and 5,725,633) are synthetic based, and incorporate polyimides and polyethersulphones. Unfortunately, such organic membranes are susceptible to chemical damage from $H_2S$ and aromatics. Such membranes also have limited temperature tolerance.

Other membrane systems (U.S. Pat. Nos. 4,857,080, 5,366,712, 5,652,020, and 5,674,301) require a multi-component approach wherein a hydrogen permeable metal, such as palladium or platinum overlays a porous ceramic substrate which is provided for strength. Such membranes have limited tolerance to elevated temperatures and are susceptible to chemical reaction with $H_2S$. Furthermore, the multi-component, heterogenous nature of these membranes adds cost and lessens the reliability of any process which-uses them.

Proton-exchange membranes have high proton conductivities, and as such, are currently in development for fuel-cell applications and hydrogen pumps. One such application is disclosed in U.S. Pat. No. 5,094,927, issued to Baucke on Mar. 10, 1992. However, inasmuch as these membranes have relatively low electronic conductivities, they are not viable for hydrogen recovery scenarios, primarily because these membranes require the application of an electric potential to drive proton transport.

U.S. Pat. No. 6,066,592, issued to Kawae, et al. on May 23, 2000 discloses a ceramic support coated with palladium or a palladium alloy such as Pd-Ag to serve as a hydrogen separator.

U.S. Pat. No. 5,980,989, issued to Takahashi, et al. on Nov. 9, 1999 discloses a gas separator membrane in which a metal for separating a gas such as palladium or a palladium alloy is filled into pores opened on the surface of a porous substrate to close them.

U.S. Pat. No. 5,652,020 issued to Collins, et al. on Jul. 29, 1997 discloses a hydrogen-selective membrane comprising a tubular porous ceramic support having a palladium metal layer deposited on an inside surface of the ceramic support.

U.S. Pat. No. 5,518,530, issued to Sakai, et al. on May 21, 1996 discloses a hydrogen permeable palladium-silver alloy membrane supported on a porous ceramic substrate.

U.S. Pat. No. 5,332,597, issued to Carolan, et al. on Jul. 26, 1994 discloses at least a two layer membrane system: 1) a porous support layer, and 2) a porous multi-component metallic oxide layer. The multi-component metallic oxide layer is formed by deposition of an organometallic vapor in the pores of a porous substrate.

None of the aforementioned patents disclose a homogeneous mixture of ceramic and hydrogen transporting metals with no interconnected porosity.

A need exists in the art for materials which can be integrally molded to form a membrane for use to facilitate hydrogen extraction from a myriad of fluids. The materials, when combined, should produce a substrate having a high permeability to molecular hydrogen so as to facilitate non-galvanic (i.e. without the application of an external electric current) hydrogen separation from fluids. The substrate also should exhibit resistance to common materials found in hydrogen-laden feed streams. The materials should be derived from relatively common materials, and should be capable of being processed into a convenient reactor geometry, such as a tube or tape. In addition, the substrate should be chemically and mechanically stronger than proton-conducting ceramics and mechanically stronger than stand-alone metallic membranes which are susceptible to hydrogen embrittlement.

SUMMARY OF THE INVENTION

It is an object of the present invention to provide a hydrogen-separation membrane that over-comes many of the disadvantages of the prior art.

Another object of the present invention is to provide a membrane to extract hydrogen from a myriad of fluids. A feature of the invention is that the membrane possesses a high permeability to hydrogen at standard pressure and temperature conditions (i.e., approximately 1 atm and approximately 25° C.). An advantage of the invention is that hydrogen separation occurs in a nongalvanic mode (i.e., without the use of electrodes or an applied electric field), primarily due to the inclusion in the membrane structure of a metal or a metal mixture which has good electronic conductivity and can dissolve atomic hydrogen. Another advantage is that the material is not easily "poisoned" by carbon monoxide or other compounds present with hydrogen in effluent or process streams.

Yet another object of the present invention is to provide a hydrogen transfer membrane for use in a myriad of environments. A feature of the membrane is that the membrane is a homogenous phase comprised of ceramic and hydrogen-permeable metal, wherein the metal is evenly dispersed throughout the ceramic. An advantage of the membrane is that it has tolerance to high temperatures and various chemicals inherent with hydrogen-laden feedstream processing, such chemicals including $H_2O$, $H_2S$ and $CO_2$. Another advantage is its low cost of fabrication.

Still another object of the present invention is to provide a hydrogen-transfer membrane having no interconnected porosity. A feature of the invention is its high selectivity for hydrogen at the exclusion of other materials. An advantage of the invention is a three to four-fold increase in hydrogen permeation rates compared to ceramic-based substrates which are not homogenized with hydrogen transporting materials.

Another object of the present invention is to provide a method for separating hydrogen from a fluid. A feature of the present invention is the incorporation of a membrane having a high hydrogen permeability. An advantage of the invention is the utilization of the method in high temperature, chemically harsh environs without degradation to the membrane.

Briefly, the invention provides for a membrane for separating hydrogen from fluids by the transport of hydrogen atoms, the membrane comprising a sintered homogeneous mixture of a ceramic powder and a metal powder, wherein the membrane has no interconnected porosity.

Also provided is a method for extracting hydrogen from a fluid stream, the method comprising contacting the fluid stream to a metal that is dispersed throughout a non-proton-conducting ceramic.

BRIEF DESCRIPTION OF THE DRAWING

The present invention together with the above and other objects and advantages may best be understood from the following detailed description of the embodiment of the invention illustrated in the drawing, wherein.

DETAILED DESCRIPTION OF THE INVENTION

Figure 1:
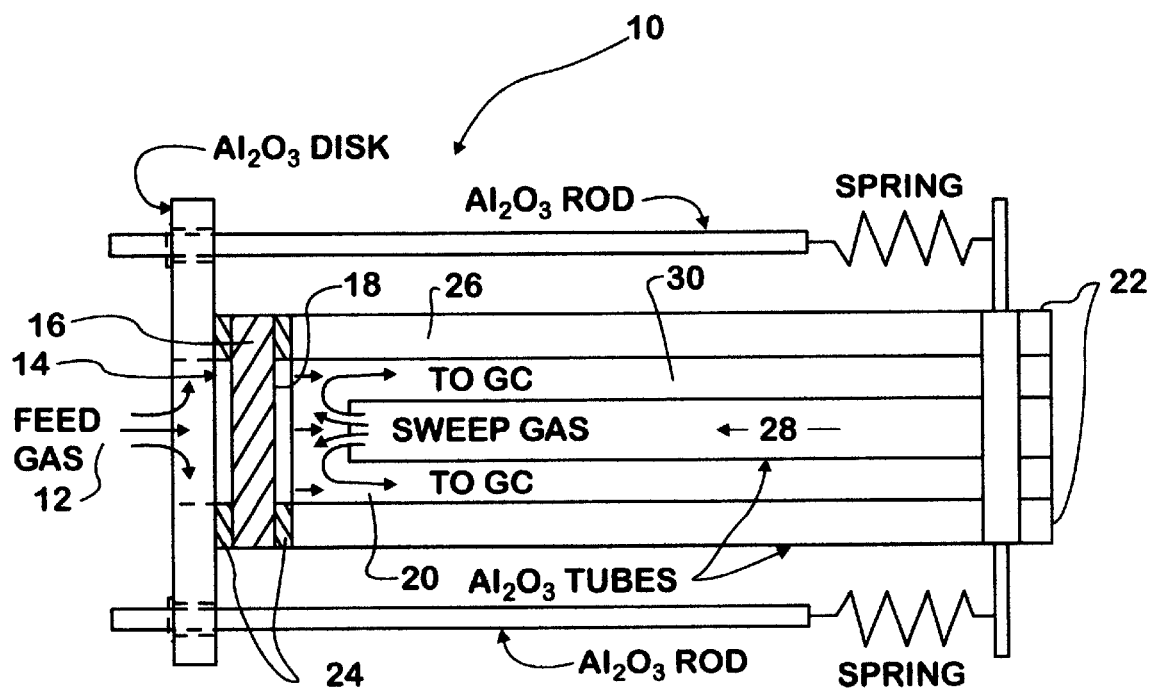
FIG. 1 is a schematic diagram of the invented membrane in use in separating hydrogen from a feed stream, in accordance with the features of the present invention.

The invention provides pure Pd, and other pure metals and binary metal mixtures to cause hydrogen transport in the form of dense ceramic/metal composites that efficiently and economically separate hydrogen from feed fluids such as gaseous mixtures. This separation occurs in a nongalvanic mode. The critical properties of the invented membrane include optimized pure hydrogen transport, and material stability in hostile environments.

In the invented composites, hydrogen diffuses through the metal phase in the form of hydrogen atoms, while the ceramic phase confers greater chemical and structural integrity and therefore acts as a mechanical support. As such, the ceramic phase does not necessarily have to be of a proton-conducting type ceramic, the later of which are relatively weak, and chemically less stable.

The invented membrane is useful in extracting hydrogen from feedstreams to produce high-purity hydrogen streams (theoretically 100% pure). The membrane also is useful in shifting equilibrium-limited reactions toward hydrogen production and away from formation of undesirable by-products by selectively removing hydrogen.

The membrane operates at a myriad of temperatures, including from 250° C. to 1500° C. Generally, the membrane comprises a composite, mechanical mixture of a ceramic component and a metal component such that the mixture results in a monolith being homogenous throughout.

Generally, the dissociation-aiding component can be one or more of a number of metals. For example, the inventors have found that the incorporation of a Group VA element or Pd or a Pd—Ag alloy/mixture in the composite provides for good nongalvanic hydrogen transport. One group of exemplary metal components (i.e., hydrogen transporting material) comprises niobium, palladium, tantalum, vanadium, and zirconium. An exemplary binary metal combination with superior transport properties is Pd—Ag (23 wt. % Ag). Pure Pd undergoes a phase transition at approximately 300° C. in hydrogen which can cause instability of the ceramic-based membranes, whereas such a phase transition is suppressed in the aforementioned Pd—Ag alloy. Silver alone does not display comparable hydrogen transport capability.

When the two components, metal and ceramic, are prepared and mixed in the manner described herein, an invented composite material is produced having the superior hydrogen transport characteristics discussed below. As a result, transport of hydrogen is enhanced from three to four-fold compared to transport rates seen in typical ceramic based structures which do not incorporate materials such as those of the instant invention.

A myriad of hydrogen-containing fluids are utilized as feedstocks, including, but not limited to, syn gas ($CO+H_2$), coal gas, process gas, and combustion gas. In fact, any fluid containing any hydrogen is a suitable feedstream. In the bench-top experiments performed by the inventors, feed gas consisted of from 4 percent hydrogen gas balanced with nitrogen, up to 100 percent hydrogen.

In one sample of the invented composite, hydrogen permeation rates of from 0.09 to 0.12 $cm^3 min^{-1} cm^{-2}$ at 500° C.

and 400° C., respectively, are achieved for a hydrogen-containing feed stream. The invented composite membrane can be utilized in feedstreams where only trace amounts of hydrogen are present (e.g., less than 1 percent). Typical hydrogen concentrations are approximately 4 percent. Suitable thicknesses of the membrane range from 0.025 mm to 5 mm. Preferable thicknesses range from 0.025 mm to 1.25 mm. In this sample, a 1.22 millimeter (mm) thick membrane was utilized.

Permeation rates of up to approximately 6 cm$^3$min$^{-1}$cm$^{-2}$ are achieved at 900° C. when 100 percent hydrogen feed gas concentrations are utilized for a membrane of thickness 0.1 mm. These permeation rates are superior to those of barium-cerium-yttrium oxide (BaCe$_{0.8}$Y$_{0.2}$O$_{3-\delta}$)-only membranes which experience permeation rates of between 0.01 and 0.025 cm$^3$min$^{-1}$cm$^{-2}$. $\delta$ in those oxides is the deviation from oxygen stoichiometry which depends on cation composition, temperature, and oxygen partial pressure.

FIG. 1 depicts a schematic diagram of the invented membrane in use. The process is designated generally as numeral 10. As a first step, hydrogen-laden feedstock fluid 12 is contacted with a first surface 14 of the composite membrane 16. The fluid 12 contacts the first surface 14 for a time and at a temperature sufficient to allow the surface 14 to assist dissociation of the hydrogen gas to hydrogen atoms. These atoms then pass through the membrane to a second surface 18 of the membrane 16. The now-passed hydrogen atoms re-associate as hydrogen gas for subsequent use or analysis 20.

Flow rates of the feed gas can vary, depending on the hydrogen concentration of the feed gas and temperature at which the membrane-containing unit is maintained. Benchtop experiments had the flow rates averaging approximately 80–200 cc/min, with the carrier or sweep gas 28 flow at approximately 40–90 cc/min.

Generally, thicknesses ranging from approximately 0.025 millimeter to approximately 5 millimeters are suitable for the membranes.

Reaction temperatures also are variable. The inventors have found that while temperatures selected from between 600° C. and 1000° C. are suitable to effect efficient hydrogen transfer, reaction chamber construction must be considered. For example, in an exemplary reaction chamber 22 depicted in FIG. 1, the membrane mounting detail includes gold O-rings as a sealant material 24 intermediate to the second surface 18 of the membrane 16 and a non-reactive support substrate 26, such as an alumina support tube. This sealant material must be chosen so as to maintain its function at target temperatures while also remaining inert. Exemplary sealing material includes, but is not limited to, commercial brazing materials and glass sealants.

Reaction sequence temperatures can be the result of the temperatures of the applied hydrogen-containing feed fluid, externally applied heats or a combination thereof. Temperature also can be effected by the temperature of any sweep gas or carrier gas stream 28 used to remove hydrogen gas reformed downstream of the second surface of the membrane.

Gas leakage through the depicted configuration 10 was determined by replacing the hydrogen feed gas with helium and measuring the helium concentration in carrier gas 28 exposed to membrane permeate. For safety purposes, a nitrogen sweep sleeve 30 was provided to quickly remove any hydrogen leaking from the reactor.

Aside from the configuration depicted in FIG. 1, the invented composite also can be formed into a tube to be hermetically sealed intermediate with a pair of tubes to form a leak-tight manifold. In a first step, the composite material is mixed with approximately 10 weight percent organics (binder, plasticizer, dispersant) as discussed in the fabrication section infra. The resulting slurry is then extruded. (By adding higher percentages of organics, the composite material also can be cast into a thin tape that can be shaped into a corrugated structure which could also serve as a reactor.)

A myriad of sealing materials can be used to join the now-formed extruded composite tube with the flanking tubes. For example, an exemplary brazing material to effect the seal is nickel-based, also containing 7 percent chromium, 4.5 percent silicon, 3.1 percent boron, 3 percent iron and less than 0.5 percent Carbon. A commercially available brazing material is Handy Flo 410 from Lucas-Milhaupt of Cudahy, Wis.

Briefly, the braze is formulated into a paste for leading into a syringe. Then, the braze is applied onto the membrane tube. The flanking tubes (constructed of an appropriate material, for example Inconel), are then positioned on the paste and the entire assembly is fired. Firing involves ramping up the assembly to 1100° C. in about one hour and then holding for approximately 15 minutes. Cooling is then commenced. The entire process is conducted in a vacuum of from 10$^{-8}$ to 10–5 torr.

In one scenario, one of the tubes supplies the hydrogen-laden fluid to the composite, while the other tube, downstream from the first tube, serves as a means of egress for the fluid from which hydrogen is extracted. The outside of the manifold is either bathed in a carrier gas or subjected to negative pressure to direct the extracted hydrogen to its final destination.

Alternatively, the application of the various feedstreams and sweep streams can be reversed; that is, the carrier gas can pass through the manifold to carry away any hydrogen permeating through from the outside to the inside surface of the composite tube.

Composite Material
Fabrication Detail

Powders for the membranes are prepared by mixing a hydrogen transport metal with Al$_2$O$_3$ (alumina), BaTiO$_3$, SrTiO$_3$, ZrO$_2$, or combinations thereof. Powders are pressed uniaxially to prepare disks (~22 millimeter diameter ×2 millimeter thickness) for sintering. Initial preparation of, for example, Pd—Ag (23 wt. % Ag)/Al$_2$O$_3$ material (40 vol. % metal mixture) includes grinding together and subsequently adding isopropyl alcohol to achieve homogeneity of the mixture. Milling of the homogenous mixture is performed overnight. The resulting milled mixture is heated to dryness then screened through a 100 mesh sieve. This results in a powder mixture wherein the metal and the ceramic components are evenly dispersed throughout the mixture.

The resulting powder is then either uniaxially pressed into pellets (2 cm in diameter) or tape-casting slips are formulated with a solvent/binder/plasticizer system. In the later case, the powders are dispersed in the organic system, cast onto a glass substrate, and leveled to a desired thickness. A predetermined diameter die is used to punch out membrane disks. Then the organics are removed through thermal decomposition by slow heating to approximately 450° C. in flowing oxygen maintained at a pressure of ~2.5 torr. The resulting tapes and pellets were then sintered at temperatures not to exceed the melting temperature of either material comprising the homogenous composite. Sintering temperatures of from 1300° C. to 1600° C. are typical. Such sintering is necessary to prevent inter-porosity which is detrimental to a hydrogen-specific transport mechanism.

A more complete protocol for combining the ceramic material with the hydrogen transporting metal to form the cermets described herein is found in pp. 44–46 of Jie Guan, "CERAMIC MEMBRANES OF MIXED IONIC-ELECTRONIC CONDUCTORS FOR HYDROGEN SEPARATION," A Dissertation Presented to the Academic Faculty of the Georgia Institute of Technology, June 1998. The entire dissertation is publically available at the Institute, and incorporated herein by reference.

Volume percent of the catalytic metal to the entire membrane monolith can vary from 20 to 60 percent. Preferably, 40 volume percent of the membrane is comprised of the catalytic material.

A hydrogen transport metal (e.g., niobium) has, by definition, a high hydrogen permeation rate and is literally a solvent for hydrogen gas. It expands abnormally and almost discontinuously upon heating in hydrogen gas, but does not expand beyond normal thermal expansion upon a second heating in hydrogen gas.

Figure 2:
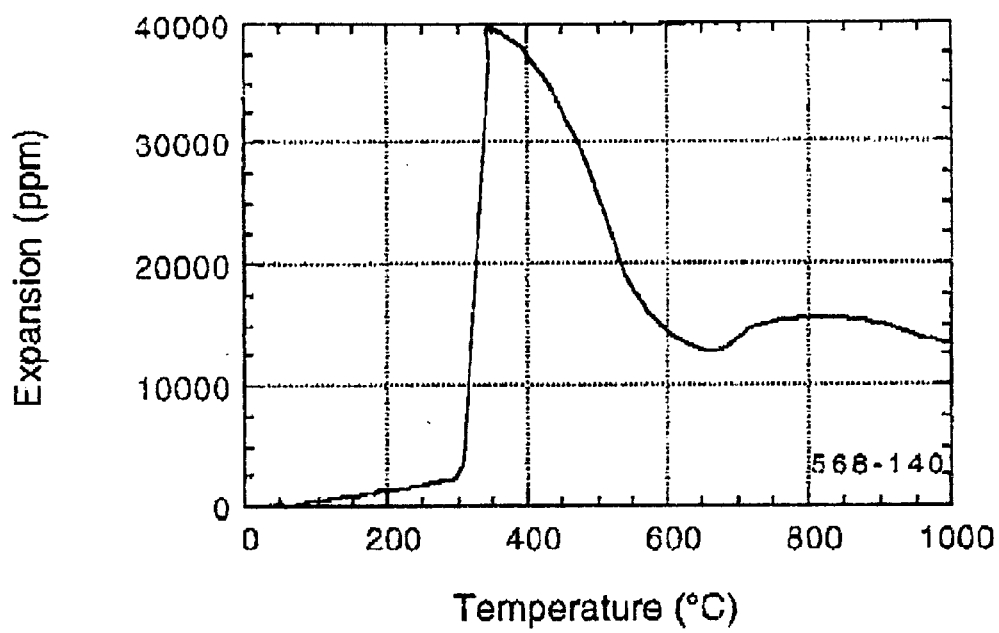
FIG. 2 is a schematic diagram of a plot of Nb expansion during heating in hydrogen gas of Nb which had never before been heated in hydrogen-containing gas, in accordance with features of the present invention.

FIG. 2 displays the expansion curve of Nb during heating in hydrogen (99.995% $H_2$). There is an abrupt and dramatic expansion at 300° C. To prevent cracking of a Nb cermet membrane while sintering, Nb powder is annealed at 700° C. (can be as high as 900° C.) for 2 hours (can be 1 to 5 hours) and then cooled (all in hydrogen) before it is mixed with enough $Al_2O_3$ powder to give a 40 vol. % cermet membrane. Pellets are pressed from the powder mixture and sintered at 1480° C. for 6 hours in 10% $H_2$/balance He. The flow of 10%$H_2$/balance He was discontinued during cooling to prevent the metal from expanding due to the re-absorption of hydrogen. Samples prepared by this procedure are ~97% dense and crack-free after sintering.

Figure 3:
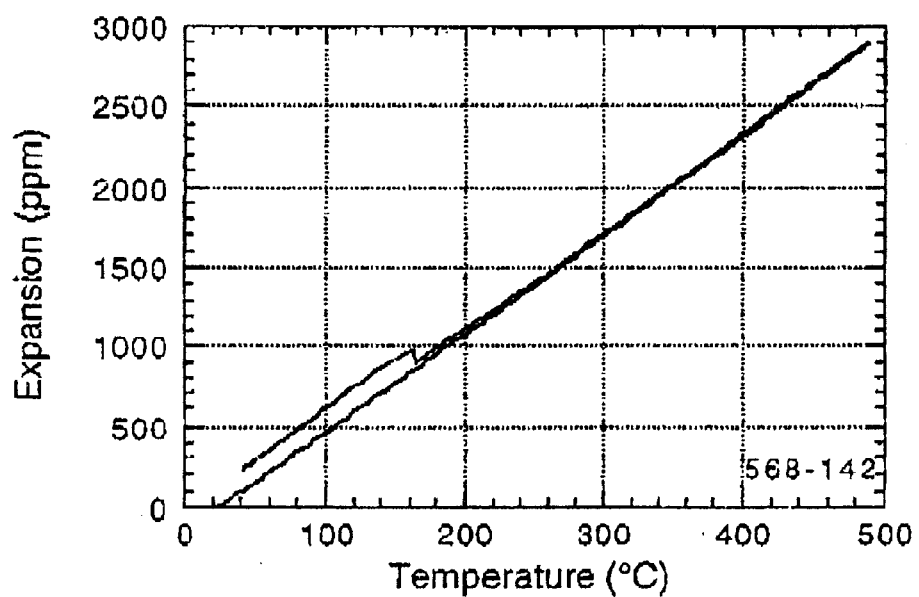
FIG. 3 is a schematic diagram of a plot of Nb expansion during heating in hydrogen gas of Nb which had been once before heated in hydrogen-containing gas, in accordance with features of the present invention.

FIG. 3 displays the smooth and linear thermal expansion of Nb, heated in hydrogen, which had once before been heated in a hydrogen-containing gas. Samples are cracked if the flow of hydrogen was continued during cooling to low temperatures (T<400° C.). This is most likely due to expansion of the metal phase as it absorbs hydrogen.

Figure 4:
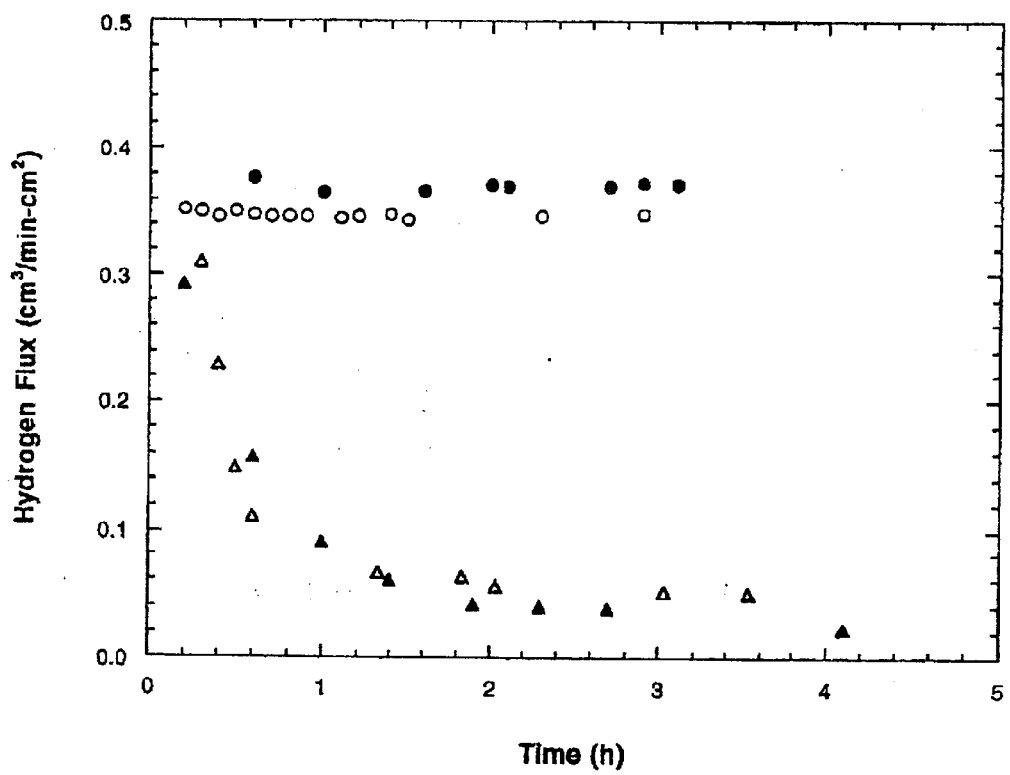
FIG. 4 is a comparison of hydrogen flux through membranes fabricated with proton conducting ceramics and ceramics which are not proton conducting, in accordance with features of the present invention.

FIG. 4 is a graph comparing hydrogen flux rates for membranes incorporating proton conducting ceramics, designated as triangles, and for membranes incorporating ceramic materials which are not proton conducting, the later membranes designated as circles. As can be noted in FIG. 4, membranes containing proton conducting ceramics render inferior hydrogen flux rates over time compared to membranes wherein alumina is utilized as a ceramic material.

In addition, the inventors found that flux rates through the invented membranes increased even more when moisture was present (filled circles in FIG. 4) versus when dry feed streams were utilized (empty circles). The added moisture results in an increase in proton concentration throughout the membrane, thereby facilitating the increased flux rates. An exemplary means for providing the moisture is by bubbling or otherwise contacting the feed gas with or through water prior to contact with the membrane. The feedgas used to arrive at FIG. 4 was 2 mole percent methane, approximately 20 percent hydrogen, and approximately 60 percent carbon dioxide. Membrane thicknesses ranged from 0.4 mm to 0.6 mm.

In summary, the membrane serves to aid dissociation of hydrogen gas contained in a feed fluid to its respective atoms. Transport of the atoms then occurs through the membrane at a rate that is roughly inversely proportional to the thickness of the membrane. At the other side of the membrane, the atoms reassociate to form molecular hydrogen gas.

Permeation rates of between 0.05 and 50 $cm^3min^{-1}cm^{-2}$ are attainable using the invented membrane and process disclosed herein, particularly if membranes with thicknesses less than 100 microns (0.1 mm) are utilized.

While the invention has been described with reference to details of the illustrated embodiment, these details are not intended to limit the scope of the invention as defined in the appended claims.

What is claimed is:

1. A method for extracting hydrogen from a fluid stream, the method comprising:

contacting hydrogen feedstock with a first surface of a metal composite membrane;

allowing hydrogen molecules to dissociate to hydrogen atoms through the first surface;

passing the hydrogen atoms through the metal composite membrane to a second surface; and collecting the hydrogen atoms.

2. The method as recited in claim 1 wherein a metal composite is annealed in hydrogen prior to being homogeneously dispersed throughout the metal composite membrane.

3. The method as recited in claim 2 wherein the metal composite is Pd, Pd-containing alloys, Nb, Ta Zr, V, or combinations thereof.

4. The method as recited in claim 1 wherein the temperature of the membrane is maintained at from 400° C. to 1500° C.

5. The method as recited in claim 1 wherein the pressure is between 1 psi and 1000 psi.

6. The method as recited in claim 1 wherein the extraction occurs nongalvanically.

7. A membrane for separating hydrogen from fluids by the transport of hydrogen atoms, the membrane comprising a sintered homogeneous mixture of a ceramic powder and a metal powder, wherein the membrane has no interconnected porosity.

8. The membrane as recited in claim 7 wherein the ceramic phase contains a metal oxide from the group consisting of $Al_2O_3$ (alumina), $BaTiO_3$, $SrTiO_3$, $ZrO_2$, and combinations thereof.

9. The membrane as recited in claim 7 wherein the metal powder comes from the group consisting of Pd, Pd-containing alloys, Nb, V, Zr, Ta or combinations thereof.

10. The membrane as recited in claim 9 wherein the metal powder is present as 20–60 volume percent of the Pd-containing alloy.

11. The membrane as recited in claim 9 wherein the metal powder is Pd mixed with Ag.

12. The membrane as recited in claim 11 wherein the Pd—Ag mixture is 23 wt % Ag.

13. The membrane as recited in claim 9 wherein the metal powder is Nb which has been annealed in hydrogen.

14. The membrane as recited in claim 13 wherein the metal Nb is annealed at 300° C. to 900° C.

15. The membrane as recited in claim 14 wherein Nb is annealed for 1 to 5 hours.

16. The membrane as recited in claim 7 wherein the membrane has a thickness of between approximately 0.025 millimeter and 5 millimeters.

17. The membrane as recited in claim 7 wherein the fluids are hydrogen-containing gases selected from the group consisting of syn gas, coal gas, combustion gas, low pressure recycle gas, high pressure recycle gas, or combinations thereof.

18. The membrane as recited in claim 7 wherein hydrogen permeates through the at a rate of between 0.05 $cm^3min^{-1}cm^{-2}$ and 50 $cm^3min^{-1}cm^{-2}$ at standard pressure and temperature conditions.

* * * * *